United States Patent [19]

Schoenwald

[11] Patent Number: 4,836,241
[45] Date of Patent: Jun. 6, 1989

[54] VALVE FOR THE CONTROLLING OF A PRESSURE DIFFERENTIAL

[75] Inventor: Siegfried Schoenwald, Bad Neustadt/Herschfeld, Fed. Rep. of Germany

[73] Assignee: Siemens Aktiengesellschaft, Berlin and Munich, Fed. Rep. of Germany

[21] Appl. No.: 86,600

[22] Filed: Aug. 18, 1987

[30] Foreign Application Priority Data

Aug. 22, 1986 [DE] Fed. Rep. of Germany ....... 3628523
Aug. 22, 1986 [DE] Fed. Rep. of Germany ... 8622554[U]

[51] Int. Cl.$^4$ ........................................... F16K 31/365
[52] U.S. Cl. ..................................... 137/494; 137/115; 137/907; 242/182; 251/63.4
[58] Field of Search ........................ 242/182, 184, 185; 137/494, 907, 115, 116; 251/127, 61.4, 357, 50, 63.4, 61.3, 77; 138/42

[56] References Cited

U.S. PATENT DOCUMENTS

| 892,788 | 7/1908 | Wilkens | 251/61.3 X |
|---|---|---|---|
| 1,217,344 | 2/1917 | Powers | 251/50 |
| 1,432,111 | 10/1922 | Lewis | 251/291 X |
| 1,514,667 | 11/1924 | Lawrence | 137/382.5 |
| 2,524,446 | 10/1950 | Johnson . | |
| 2,599,872 | 6/1952 | Slonneger | 137/61.3 |
| 2,805,685 | 9/1957 | Jopson | 138/42 |
| 2,883,998 | 4/1959 | Broughton . | |
| 3,946,447 | 3/1976 | Moon | 4/415 |
| 4,158,437 | 6/1979 | Nielsen . | |
| 4,458,712 | 7/1984 | Stevenson | 137/907 X |
| 4,633,845 | 1/1987 | Seleno | 137/907 X |

FOREIGN PATENT DOCUMENTS

| 1269889 | 6/1968 | Fed. Rep. of Germany . | |
|---|---|---|---|
| 2249273 | 5/1975 | France . | |
| 215756 | 12/1983 | Japan | 242/182 |
| 2071817 | 9/1981 | United Kingdom . | |

*Primary Examiner*—Stephen Hepperle
*Attorney, Agent, or Firm*—Hill, Van Santen, Steadman & Simpson

[57] ABSTRACT

A valve for controlling a pressure differential between a high and low pressure, characterized by a housing being sub-divided by a transfer port into a first and second chamber, each having ports, a valve member movable in the first chamber to close the transfer port, a spring arrangement for urging the valve member to a closing position, a membrane extending across an opening end of the housing, which is in communication with the first chamber and held on by a cap forming a third chamber having a port and means for connecting the valve member to the membrane so that when a pressure differential between the pressure in the first chamber and third chamber exceeds the value of the spring arrangement, the transfer port is open to allow passage of the pressure in the first chamber into the second chamber. The valve can be used in controlling a compressor by allowing the dumping of the output of the compressor when the pressure differential is exceeded and can be used for controlling a vacuum system by dumping ambient air into the vacuum system when the vacuum exceeds a certain amount. In addition, the valve can be utilized for maintaining a pressure differential on a tape loop box of a reel-to-reel magnetic tape recorder.

6 Claims, 4 Drawing Sheets

VALVE FOR THE CONTROLLING OF A PRESSURE DIFFERENTIAL

BACKGROUND OF THE INVENTION

The present invention is directed to a valve for controlling pressure in a system which may either be a compressor, a vacuum pump or other device creating a differential pressure. The valve has a housing with an internal valve seat separating the housing into a first and second portion which have ports, a valve member is biased on the valve seat and has a rod for connecting it to a membrane mounted in a membrane housing so that pressure acting on two sides of the membrane, when reaching a determined differential will counteract a spring urging the valve member to a closed position.

U.S. Pat. No. 4,158,437, whose disclosure is incorporated by reference and which claims priority from German Application No. 24 59 485, discloses a thermostatic expansion valve for a refrigerator plant. The valve has a housing which is separated into two portions by a valve seat, each portion having a port. A valve member is urged into a closing position on the valve seat by a spring and has a valve rod connected to a membrane in a membrane housing. One side or surface of the membrane has a capillary tube inlet, and the other side or surface of the membrane is engaged by a bellows, which is in communication with the fluid pressure in the one portion of the housing while the remaining portion of that other surface of the membrane has pressure from the other portion of the valve housing acting thereon. Thus, when the pressure differential acting on the membrane reaches a certain value, the valve will open to allow passage from the first port to the second port. Such a valve is specifically intended to serve for employment as a thermostatic expansion valve in a refrigerating plant. As a consequence, it requires construction which is far too expensive for many application, for example, seals on the various valve stem members.

SUMMARY OF THE INVENTION

The object of the present invention is to provide a valve for controlling the flow of fluid in response to differential pressure, whose structure is significantly simplified and works very exactly and practically hysteresis-free.

The objects of the present invention are obtained in a valve for the control of a fluid pressure, said valve comprising a valve housing having a transfer port forming a first chamber or portion having a first port and a second chamber or portion having a second port, a membrane being mounted on the valve housing with one surface of the membrane in communication with the first chamber and the other surface of the membrane being covered by a cap to form a third chamber or portion, a valve member movable in said first chamber of the housing between an open position and a position closing the transfer port, spring means biasing the valve member to the closed position, said valve member having a rod terminating in an end with means for connecting the rod to the membrane so that as a pressure in the first chamber exceeds the pressure in the third chamber by a predetermined amount, the valve disc is moved against the spring means to an open position to allow passage of fluid in the first chamber into the second portion and out the second port.

As a result of applying pressure on the one side of the membrane only from the first portion of the housing, a pressure-tight bearing, otherwise required for the connecting part needed for the coupling of the guide element to the membrane, are eliminated. Such a bearing of the prior art devices leads to frictional losses which, in the final analysis leads to a hysteresis behavior for the valve.

Any and all frictional losses upon actuation of the valve disc by the membrane are avoided in that the coupling parts connecting the guide element to the membrane are conducted through a connecting opening in a non-contacting fashion, and through the same opening that the fluid in the first portion of the valve housing moves to act on the membrane. Also occurring in this embodiment is that the connection is a tensile connection between the membrane and the guide element, which is distinguishable by a high positional stability.

A deterioration of the exact operating mode of the valve as a consequence of manufacturing tolerances is avoided because the coupling element provided with an eyelet is provided on the membrane and a hook, which is pivoted to the guide element, is pivotable into a position capable of being engaged in the eyelet. This represents an embodiment of a movable articulation that is especially simple in structural terms.

When the valve is utilized in a control circuit, then a corresponding dampening of the reference pressure applied in the third chamber is needed in order to avoid self-vibration of the valve. Such a dampening is achieved by a dampening means in a tube in or extending to the third port. The dampering means can use a constriction or a capillary, a stopper of porous material or fibrous material in a connecting nipple to the third portion or in a control line which is extending to the third portion of the housing.

The valve of the present invention can be used for controlling a vacuum pump in that a pressure control line of the valve extending to the third chamber of the housing and is connected to either the vacuum tank for the vacuum pump or on a suction side of the vacuum pump. In addition, the first port is in communication with atmospheric pressure, while the second port is either in communication with the vacuum tank or a suction side of the vacuum pump.

The valve can also be utilized in controlling the output of a compressor. This is accomplished by the first port being connected to the output of the compressor or to a pressure vessel connected to the output of the compressor. The second port is in communication with atmospheric pressure and atmospheric pressure is supplied to the third portion so that when the pressure differential between the output of the compressor exceed a predetermined differential over atmospheric pressure, the valve disc is moved to an open position to dump the output of the compressor to the atmosphere.

Another use of the valve is to control the formation of a loop of magnetic tape formed in a reel-to-reel magnetic tape recorder. A reel-to-reel magnetic recorder is disclosed in German Pat. No. 12 79 745 and has a loop of magnetic tape formed between two reeling stations to serve as a buffer. This loop must comprise a defined length in the quiescent condition of the device. This is achieved by an appropriate adjustment of a vacuum pump allocated to the magnetic tape recording means.

It has been shown, however, that considerable fluctuations in view of the loop length occurs, given a one-time adjustment, and these fluctuations are caused by changing air pressures or by changes in the tape widths.

This is also true when the devices are operated at a location whose altitude above sea level differs from the altitude of the location at which the devices were adjusted.

Since it is desirable to obtain the exact loop length in the quiescent condition of the apparatus, even when some of the operating variables change, the valve of the present invention can be used for controlling the application of the vacuum to the convex side of the loop. When the vacuum on the convex side of the loop is too high, then ambient air will be emitted to the suction side of the vacuum pump. Thus, the desired pressure differential in a loop box containing the loop will be controlled by the valve of the present invention.

Other advantages, and objects will be readily apparent from the following description of the preferred embodiments, the drawings and claims.

DESCRIPTION OF THE PREFERRED EMBODIMENTS

Figure 1:
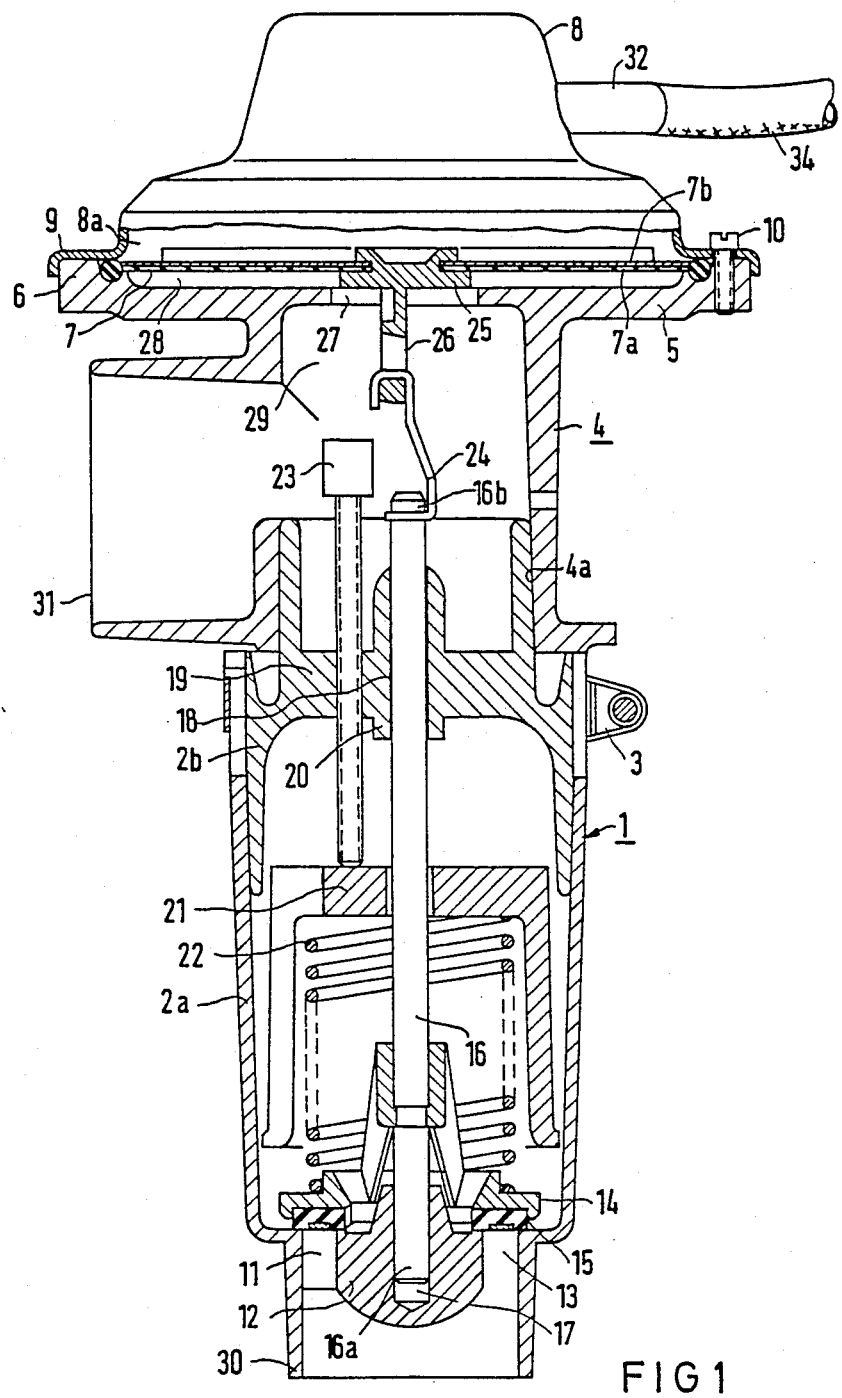
FIG. 1 is a longitudinal cross sectional view with portions in elevation for purposes of illustration of a valve in accordance with the present invention.

The principles of the present invention are particularly useful in a valve, generally indicated at 1 in FIG. 1. The valve 1 has a housing formed by housing parts 2a and 2b, as well as a housing part 4. As illustrated, the two housing parts 2a and 2b are telescoped into one another and are held together with a circular clamp 3 which has a threaded tightening arrangement. The third housing part 4 has a socket portion 4a which is used to plug the third housing onto the second housing part 2b. In addition, the third housing part has an annular flange 5 opposite to the socket 4a, which flange is provided with a seating edge 6 which has an annular groove for receiving an annular beaded edge of a membrane 7. The membrane 7 has its beaded periphery or edge clamped in the groove by a fastening edge or flange 9 of a housing cap 8. The holding of the flange 9 onto the flange or edge 6 can be accomplished by any standard fastening means and, as illustrated, is done by screws 10.

Arranged in the first housing part 2a is an intermediate member 12, which is supported by retaining webs 11, which have a spider-type configuration. Thus, an annular transmission or transfer port 13 is provided and subdivides the housing formed by the parts 2a and 2b into a first portion or chamber 29, with a first port 31 and a second chamber having a second port 30. As illustrated, the transmission port 13 is covered by a valve disc 14 that is provided with a sealing ring 15 of elastic material. The valve disc 14 is connected to a rod 16 that acts as a guide element or guide rod. An end 16a of the rod 16 projects into a bore 17 of the intermediate member 12. An opposite or second end 16b extends through a guide bore 18 of a guide element or hub 20, which is provided in the second housing part 2a by retaining elements 19 which can have the form of a spider configuration.

An abutment 21 is axially displaceable relative to the rod 16 and is arranged in the region between the guide hub 20 and the intermediate member 12. A coil spring 22, which acts on the valve disc 14, is entrapped between the disc 14 and the abutment 21. The axial position of the abutment 21 on the rod 16 can be changed by a set screw 23, which is screwed through the retaining element 19. The abutment can be axially adjusted with this screw and, thus, the response pressure for the valve can be modified. The spring 22 provides spring means for biasing the valve disc or member to a first position which closes the transmission port 13.

On the opposite end 16b of the rod 16, a hook 24 is articulatedly connected and this hook is hooked into an eyelet or opening 26 which is provided in a coupling element 25 that is connected to the membrane 7. The coupling element 25 has its eyelet 26 projecting through a connecting opening 27 that is provided in the area of the annular flange 5. Thus, the coupling element 5 projects through the opening 27 in a non-contacting fashion. A space 28 bounded by a surface 7a of the membrane and the annular flange 5 is connected through the opening 27 to the interior of the first chamber or portion 29 of the housing. Thus, pressure in the first portion will act on the surface 7a of the membrane.

Figure 2:
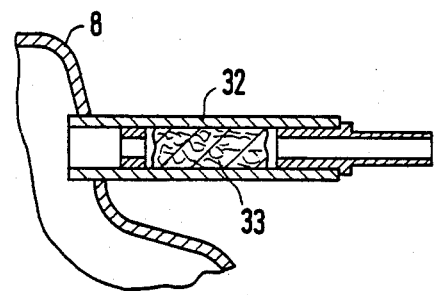
FIG. 2 is a partial cross sectional view of a connecting nipple provided on the housing cap of the valve of FIG. 1.

The first port 31 and the second port 30 act as emission or discharge ports, depending on the manner in which the valve 1 is employed. The valve is connected to a pressure control line 34 by a connecting nipple 32, which is arranged in a housing cap 8 so that a third chamber or portion 8a of the housing acting on the other surface 7b of the membrane can be in communication to a pressure control line. With a low pressure control, the actual value of the low pressure being controlled is supplied to the valve via this pressure control line 34. In order to avoid disturbing vibrations, dampening means are provided either in the connecting nipple 32 or in the control line 34. The dampening means can be a constriction in a tubing, a capillary tubing or, as illustrated in FIG. 2, can involve a stopper 33 of a fibrous or porous material. Instead of being arranged in the nipple, as illustrated in FIG. 2, this dampening element could also be arranged in the pressure control line 34.

Figure 3:
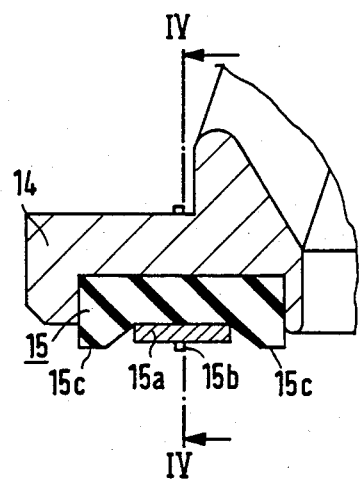
FIG. 3 is an enlarged partial cross sectional view of a valve disk with a sealing ring in accordance with the present invention.

In accordance with different applications, the valve 1 can be traversed in different directions by a medium. When the medium flows past the valve disc 14 towards the transfer port 13, then the medium will exert a force on the sealing ring 15, which attempts to separate the sealing ring 15 from the valve disc 14. An annular retaining disc 15a (FIGS. 3 and 4) is therefore arranged centrally relative to the sealing ring 15. This retaining disc 15a is secured with a plurality of retaining clamps 15b, which are constructed in the manner of staples and are uniformly distributed over the circumference of the disc 15a.

Figure 4:
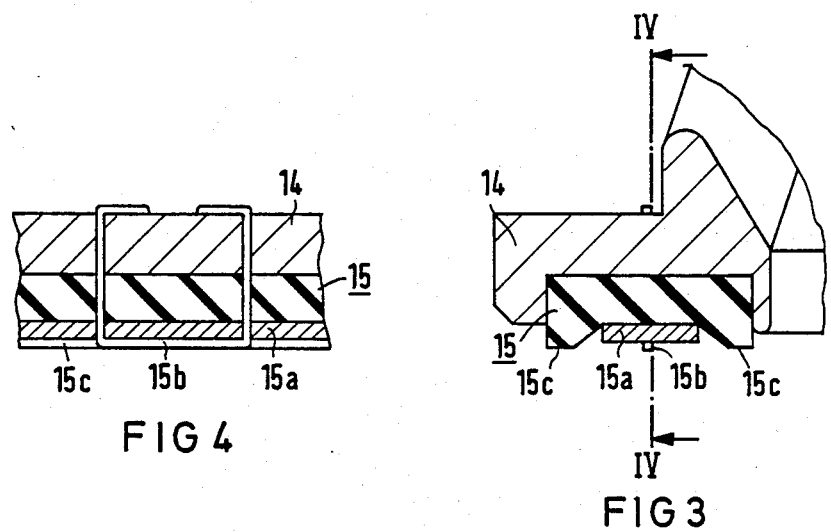
FIG. 4 is a cross sectional view taken along the lines IV—IV of FIG. 3.

As may be seen in FIG. 4, the retaining clamps 15b have their two retaining arms engaged through corresponding bores in the valve disc 15 and are bent over on the backside of the valve disc 14 in the fashion of staples. As a result of the retaining disc 15a, the sealing ring 15 is reliably held against the valve disc, even in opposition to extremely high flow pressures. The concentric sealing lips 15c will proceed on both sides of the retaining disc 15a and are not influenced by the retaining disc 15a so that the sealing action of the sealing ring is not deteriorated.

In operation of the valve 1, pressure in the first portion or chamber 29 and pressure in the third chamber 8a act on the surfaces 7a and 7b of the membrane so that a pressure differential is determined. When the pressure in the first chamber 29 exceeds a given pressure differential, it will urge the membrane upward to lift the disc or valve member formed by the valve disc 14 and seal 15 against the force of the spring 22 to allow flow from the first chamber 29 into the second chamber and out the second port 30. In each of the following descriptions of use of the valve, the first portion 29 always has the higher pressure than the third chamber 8a and the second port 30 appears to always be in communication with the same pressure as in the chamber 8a.

Figure 5:
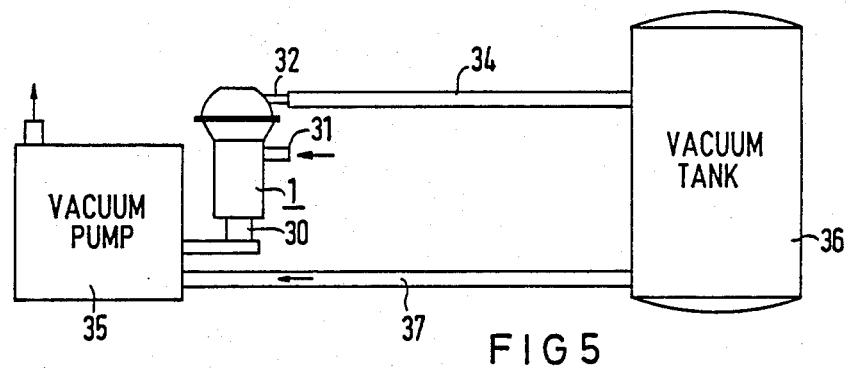
FIG. 5 is a schematic illustration of the use of the valve of the present invention for controlling a vacuum pump system.

The valve 1 can be used for controlling a vacuum pump 35 (FIG. 5). As illustrated, the second port 30 is connected to an intake or suction of a vacuum pump 35. The vacuum pump also has an intake or suction connected to a suction line 37, which extends between the vacuum pump 35 and a vacuum tank or vessel 36. The pressure control line 34 in the illustrated embodiment is connected to the vacuum tank 36. It is also possible to connect the pressure line 34 to the suction line 37 or to the suction side of the vacuum pump 35. This is dependent upon the location in the system at which an optimum, constant low pressure is to be achieved.

In the arrangement illustrated in FIG. 5, the vacuum or low pressure in the pressure control line 34 is directed into the third chamber 8a to act on the side 7b of the membrane. Since the first port 31 is in communication with atmospheric pressure, atmospheric pressure is in the first chamber 29 and acts on the side 7a of the membrane. As the amount of vacuum increases, or as the pressure in the tank 35 decreases below atmospheric pressure, a pressure differential acting on the membrane will move the membrane upward into the housing cap 8 and overcome the force of the spring 22 so that the membrane will raise the valve disc 14 due to the connection formed between the hook 24, the rods 16 and coupling member 25. Air will then flow into the second chamber and through the second port or nozzle 30 into the vacuum pump 35 reduce the quantity of air taken via the suction line 37 so that the pressure in the vacuum tank 36 will no longer drop and the vacuum in the tank 36 will not increase. When the low pressure in the vacuum tank or vessel 36 increases, then the pressure differential acting on the membrane will stop overcoming the force of the coil spring, and the spring will again cause the valve disc 14 to be pressed against the transfer port 13 to close it. The valve is thus opened and closed in accordance with the pressure modifications that occur within the tank 36 or on the suction side of the vacuum pump 35.

Figure 6:
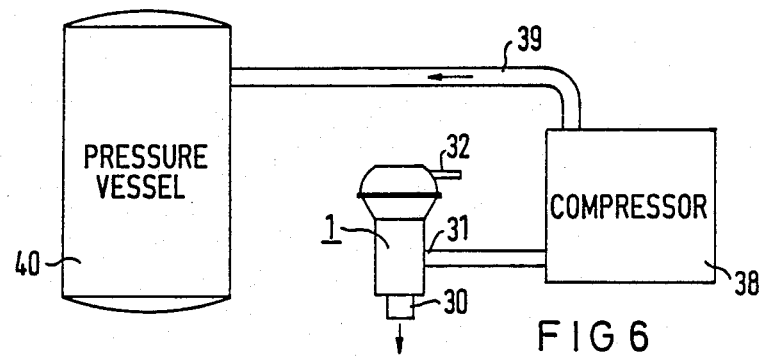
FIG. 6 is a schematic illustration of the valve of the present invention being utilized to control a compressor system in accordance with the present invention.

The valve 1 can also be utilized for controlling the output pressure of a compressor, such as a compressor 38 of FIG. 6. As illustrated, the first port 31 is connected to the output of the compressor, which also has a pressure line 39 extending to a pressure vessel 40. The second port 30 is in communication with the atmosphere, as is the nipple 32. Thus, the pressure in the first chamber of the valve 1 will act on surface 7a, while the atmospheric pressure acts on surface 7b. As soon as the pressure differential acting on the membrane exceeds the force of the spring 22, the valve disc 7 is raised by the deflection of the membrane and a part of the compressed air can flow through the transfer port 13 and the second port 30 to be dumped into the atmosphere. This dumping will cause the pressure in the vessel 40 to no longer be increased. When the pressure vessel 40 drops below a predetermined value established by the tension of the coil spring 22, then the valve 1 will close again and the compressed air is again conveyed into the pressure vessel 40. In this control arrangement, the valve is either opened or closed, in accordance with the respective pressure modifications.

Figure 7:
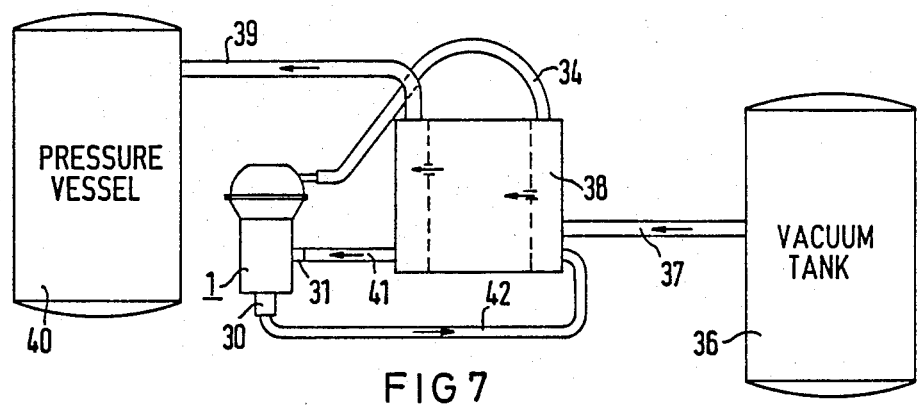
FIG. 7 is a schematic illustration for controlling a pressure differential in a compressor system in accordance with the present invention.

In the arrangement of FIG. 7, the valve 1 is utilized for controlling the differential pressure between a vacuum tank or low pressure vessel 36 and a high pressure vessel 40. To this end, the valve has its first port 31 connected to a delivery side of a compressor by a line 41. In addition, the pressure line 39 goes from the delivery side to the vessel 40. The compressor 38, on an intake side, has a suction line 37 that extends to the vacuum tank 36. In addition, the second port 30 is connected by a bypass line 42 to the suction side of the compressor and the control line 34 is also connected to the suction side of the compressor. It should be noted that the pressure control line 34 can also be connected to other points besides the suction side of the compressor 38, for example, into the suction line 37 or also the vacuum tank 36.

In the arrangement illustrated in FIG. 7, the control line 34 applies a pressure in the third chamber 8a in the housing cap 8 and on the surface 7b of the membrane. Also, a high pressure from the output of the compressor 38 is applied to the first chamber 29 to act in the space 28 and on the surface 7a of the membrane. As soon as the pressure differential between the fluids in the chambers 28 and 8a are sufficient to exceed the power or the force of the coil spring 22, the membrane will move to lift the valve disc 14 from the transfer port 13 so that a portion of the output of the compressor 38 will flow out of the second port 30 into the bypass line 42 to the intake side or suction side of the compressor. On the basis of appropriate adjustment of the set screw 23 to change the tension or spring constant of the spring 22, the size of the pressure differential can be determined. Given the illustrated connection of the valve 1 directly to the suction and to the delivery sides of the compressor 38, the differential pressure at the compressor 38 is held to a constant value. When the valve has its first connecting port 31 connected to a pressure side and the second port 30 connected to the vacuum side, then the pressure differential between the vacuum and pressure side will be obtained.

It is also possible to modify the connections by connecting the first port 31 to the tank 40 while the second port 30 is connected to the vacuum tank 36 so that a pressure differential between these two vessels will be held constant.

Figure 8:
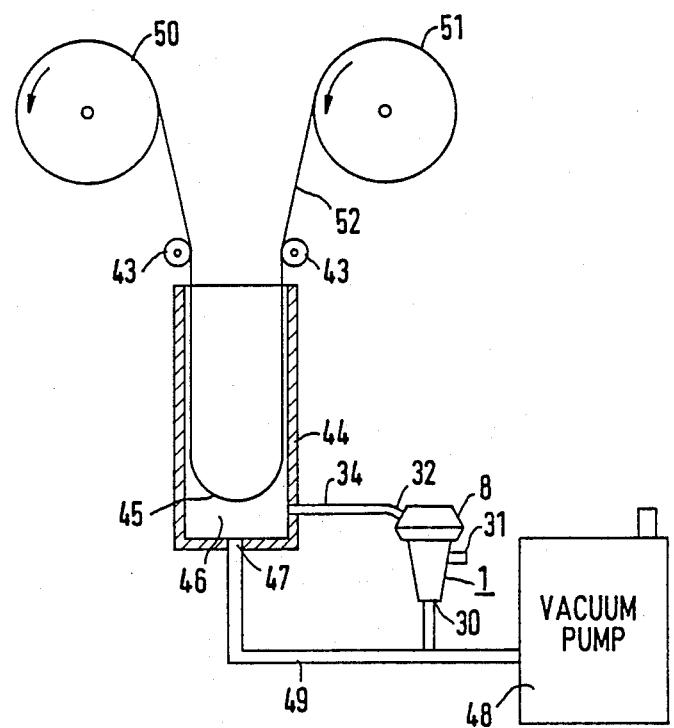
FIG. 8 is a schematic illustration of the valve being utilized for controlling a pressure applied in a reel-to-reel magnetic recording means in accordance with the present invention.

In a reel-to-reel magnetic tape recording means, such as illustrated schematically in FIG. 8, has a take-up station or reel 50 and a take-off station or reel 51. The function of these stations can also be interchanged by reversing the rotational sense or drive of each of these reels. A magnetic tape 52, which can be rewound between these two stations, runs over guide rollers, such as 42, into a loop box 44. A suction open 47 is connected by a suction line 49 to a suction side of a vacuum pump 48. This arrangement provides a suction in a region 46 which is formed in the box 44 by the convex side 45 of the tape 52. The concave side of the tape in the box is subjected to atmospheric pressure. For controlling the loop length, the valve 1 has its discharge opening or second opening 30 connected to the suction line 49. The valve can also be connected to some other location of the suction region, for example, directly to the suction side of the vacuum pump 48 or even to the space 46 of the loop box 44. The first port 31 is an inlet port and is in communication with ambient air. The pressure control line 34 is in communication with the region 46 of the loop box 44 so that the vacuum in the space 46 is applied to the chamber 8a and acts on the surface 7b of the membrane 7.

With this arrangement, the magnetic tape recorder means functions the following way. Due to the control line 34, the vacuum prevailing in the region 46 of the loop box 44 is transmitted onto the side 7b of the membrane. As soon as the force exerted on the membrane 7 by this vacuum creates a pressure differential sufficient to counteract the coils spring 22, the membrane will move towards the housing cap 8 and thereby raise the valve seat 14 via the hook 24 and rods 16 so that ambient air can flow through the nozzle 30 of the pressure control valve 1. This air flow into the suction line 49 thereby reduces the quantity of air being drawn from the loop box 44 via the suction line 49 so that the low pressure or vacuum no longer drops. When the low pressure in the region 46 again increases, then the pressuring power exerted by the coil spring 22 will dominate the lift-off force exerted by the pressure differential acting on the membrane 7 so that the valve disc 14 is again pressed against the transmission port 13 and closes it. Since the valve 1 reacts in an extremely sensitive way and works nearly hysteresis-free, the vacuum in the loop box 44 can be successfully controlled so precisely that the desired loop length is exactly observed, regardless of respective air pressure conditions and regardless of deviations in the dimension of the width of the tape. The valve 1 generates the same pressure differential between the concave and convex side of the tape loop in the magnetic tape recorder means, which is independent of the respective ambient air pressure so that the tape loop always comprises the same length, in the quiescent condition of the apparatus.

As a result of the inventive structure of the valve 1, the frictional loss on the parts moving when the valve 1 operates are reduced to a minimum so that a pressure required for opening and closing the valve are practically identical and the valve, thus, operates nearly free of hysteresis. This has the advantage that an extremely precise pressure control is possible with the valve.

It is especially advantageous for the structural format of the valve 1 that the surface 7b of the membrane 7 covered by the housing cap 8 is always charged with a low pressure in comparison to the surface 7a facing towards the first chamber or interior 29 of the valve. A connection that is only stressed for tension, thus, occurs for coupling the rod 16 to the membrane 17 and this condition is easily constructed, despite manufacturing tolerances that are always required. In addition, seals for the coupling element 25 extending between the interior or first chamber 29 of the valve and the space or sub-chamber 28 adjacent the surface 7a of the membrane and the annular flange 5 are also avoided. Such seals would result in friction losses which would destroy the hysteresis-free functioning of the valve.

Although various minor modifications may be suggested by those versed in the art, it should be understood that I wish to embody within the scope of the patent granted hereon all such modifications as reasonably and properly come within the scope of my contribution to the art.

I claim:

1. A valve for controlling a pressure in a medium, said valve comprising a valve housing having an interior transfer port dividing the housing into a first chamber and a second chamber, said housing having a first port in communication with the first chamber and a second port in communication with the second chamber, a valve disc positioned in the first chamber and movable to a first position closing the transfer port and being movable to a position inward from the first position to open the transfer port, spring means for biasing the valve disc to the first position to close the transfer port, said first chamber having a connection opening and a flange with a membrane secured thereon surrounding said opening, one side of the membrane being acted on by the pressure in said first chamber passing through said connecting opening, a cap being clamped on the opposite side of the membrane to form a third chamber, said cap having a port to enable applying a pressure to said third chamber, and connecting means extending through the connecting opening in a non-contacting fashion for coupling a tension force from the membrane to said valve disc so that when a pressure differential between the first chamber and third chamber exceeds the force of the spring means, said valve disc is lifted from the transfer port to enable flow from the first chamber into the second chamber and out of the second port, said connecting means including a guide rod secured to the valve disc and connecting parts, said connecting parts including a coupling element being secured to the membrane and having an eyelet, and a hook being articulatedly hinged to the end of the guide rod and being engagable in said eyelet.

2. A valve according to claim 1, wherein dampening means are provided in the third port for the third chamber for smoothing out pressure changes being applied to said third port.

3. A valve for controlling a pressure in a medium, said valve comprising a valve housing having an interior transfer port dividing the housing into a first chamber and a second chamber, said housing having a first port in communication with the first chamber and a second port in communication with the second chamber, a valve disc positioned in the first chamber and movable to a first position closing the transfer port and being movable to a position inward from the first position to open the transfer port, spring means for biasing the valve disc to the first position to close the transfer port, said first chamber having a connecting opening and a flange with a membrane secured thereon surrounding said opening, one side of the membrane being acted on by the pressure in said first chamber passing through said connecting opening, a cap being clamped on the opposite side of the membrane to form a third chamber, said cap having a third port to enable applying a pressure to said third chamber, dampening means being provided in the third port for the third chamber for smoothing out pressure changes being applied to said third port, said dampening means including a porous member received in said third port, and connecting means extending through the connecting opening in a non-contacting fashion for coupling a tension force from the membrane to said valve disc so that when a pressure differential between the first chamber and third chamber exceeds the force of the spring means, said valve disc is lifted from the transfer port to enable flow from the first chamber into the second chamber and out of the second port.

4. A valve for controlling a pressure in a medium, said valve comprising a valve housing having an interior transfer port dividing the housing into a first chamber and a second chamber, said housing having a first port in communication with the first chamber and a second port in communication with the second chamber, a valve disc positioned in the first chamber and movable to a first position closing the transfer port and being movable to a position inward from the first position to open the transfer port, said valve disc having a sealing ring facing the transfer port and an annular retaining disc connected to the valve disc for securing the sealing ring to the valve disc, so that the pressure of the annular retaining disc on the sealing ring creates two concentric sealing lips with the annular retaining disc being disposed therebetween, spring means for biasing the valve disc to the first position to close the transfer port, said first chamber having a connecting opening and a flange with a membrane secured thereon surrounding said opening, one side of the membrane being acted on by the pressure in said first chamber passing through said connecting opening, a cap being clamped on the opposite side of the membrane to form a third chamber, said cap having a port to enable applying a pressure to said third chamber, and connecting means extending through the connecting opening in a non-contacting fashion for coupling a tension force from the membrane to said valve disc so that when a pressure differential between the first chamber and third chamber exceeds the force of the spring means, said valve disc is lifted from the transfer port to enable flow from the first chamber into the second chamber and out of the second port.

5. A valve according to claim 4, wherein said annular retaining disc is secured to the valve disc by a plurality of retaining clamps distributed on the circumference thereof and having the configuration of staples.

6. A valve for controlling a pressure in a medium, said valve comprising a valve housing having an interior transfer port dividing the housing into a first chamber and a second chamber, said housing having a first port in communication with the first chamber and a second port in communication with the second chamber, a valve disc positioned in the first chamber and movable to a first position closing the transfer port and being movable to a position inward from the first position to open the transfer port, said valve disc having a sealing ring facing the transfer port, and an annular retaining disc being connected to the valve disc for securing the sealing ring to the valve disc by a plurality of retaining clamps being distributed uniformly on the circumference of the annular retaining disc and having the configuration of staples, spring means for biasing the valve disc to the first position to close the transfer port, said first chamber having a connecting opening and a flange with a membrane secured thereon surrounding said opening, one side of the membrane being acted on by the pressure in said first chamber passing through said connecting opening, a cap being clamped on the opposite side of the membrane to form a third chamber, said cap having a port to enable applying a pressure to said third chamber, and connecting means extending through the connecting opening in a non-contacting fashion for coupling a tension force from the membrane to said valve disc so that when a pressure differential between the first chamber and third chamber exceeds the force of the spring means, said valve disc is lifted from the transfer port to enable flow from the first chamber into the second chamber and out of the second port.

* * * * *